United States Patent
Bang et al.

(10) Patent No.: US 9,961,629 B2
(45) Date of Patent: May 1, 2018

(54) METHOD AND APPARATUS FOR MODULATING DATA AND RECORDING MEDIUM THEREOF

(71) Applicants: SAMSUNG ELECTRONICS CO., LTD., Suwon-si (KR); POSTECH ACADEMY-INDUSTRY FOUNDATION, Pohang-si (KR)

(72) Inventors: Jongho Bang, Suwon-si (KR); Namjeong Lee, Suwon-si (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 2 days.

(21) Appl. No.: 14/793,103

(22) Filed: Jul. 7, 2015

(65) Prior Publication Data

US 2016/0044270 A1     Feb. 11, 2016

(30) Foreign Application Priority Data

Aug. 5, 2014  (KR) .................. 10-2014-0100663

(51) Int. Cl.
*H04B 10/00* (2013.01)
*H04W 52/00* (2009.01)
*H04W 52/26* (2009.01)

(52) U.S. Cl.
CPC ............ *H04W 52/00* (2013.01); *H04B 10/00* (2013.01); *H04W 52/262* (2013.01)

(58) Field of Classification Search
CPC ..... H04L 27/00; H04L 27/361; H04L 27/362; H04N 5/40; H03C 3/40; H03F 1/0222; H03F 3/24; H03M 1/0682; H04B 1/0483
USPC ..................................................... 375/295
See application file for complete search history.

(56) References Cited

U.S. PATENT DOCUMENTS

| | | | | |
|---|---|---|---|---|
| 4,896,287 A | * | 1/1990 | O'Donnell ............ | G06F 7/4812 708/622 |
| 4,937,868 A | * | 6/1990 | Taguchi ................ | G10L 19/093 704/207 |
| 4,945,505 A | * | 7/1990 | Wiener ................. | G06F 7/4818 708/204 |
| 5,430,764 A | * | 7/1995 | Chren, Jr. ............. | G06F 1/0328 331/187 |
| 5,432,815 A | * | 7/1995 | Kang ..................... | H04B 1/707 375/141 |
| 5,579,341 A | * | 11/1996 | Smith ..................... | H04B 1/26 375/267 |
| 5,978,388 A | * | 11/1999 | Park ....................... | H04Q 1/453 370/525 |

(Continued)

FOREIGN PATENT DOCUMENTS

WO   WO 2007074411 A2 *  7/2007 ............... H03D 7/14

*Primary Examiner* — Chieh M Fan
*Assistant Examiner* — Berhanu Tadese
(74) *Attorney, Agent, or Firm* — NSIP Law (57) ABSTRACT

Provided are a method and apparatus for modulating data including a controller. The controller is configured to determine sizes of a first complex-number component and a second complex-number component of input data, and determine a cell to assign a sine wave to the input data, based on a difference between the sizes of the first complex-number component and the second complex-number component.

20 Claims, 7 Drawing Sheets

(56) References Cited

U.S. PATENT DOCUMENTS

| | | | |
|---|---|---|---|
| 6,397,044 B1* | 5/2002 | Nash | H03C 3/0925 455/112 |
| 6,400,233 B1* | 6/2002 | Thomas | H03C 3/40 329/304 |
| 6,434,401 B1* | 8/2002 | Recouly | H04B 1/005 455/553.1 |
| 7,117,234 B2* | 10/2006 | Khlat | H04L 27/122 708/270 |
| 7,564,922 B2* | 7/2009 | Kim | H03B 5/24 332/120 |
| 7,907,029 B2* | 3/2011 | Schwoerer | H03C 5/00 332/149 |
| 8,090,051 B2* | 1/2012 | Hoyerby | H03F 1/34 375/297 |
| 8,461,901 B1* | 6/2013 | Morton | H03D 7/1441 327/355 |
| 8,639,205 B2* | 1/2014 | Deng | H04B 1/16 375/345 |
| 9,276,676 B2* | 3/2016 | Yokoi | H04B 10/116 |
| 2001/0016016 A1* | 8/2001 | Eidson | H03C 3/40 375/302 |
| 2002/0150169 A1* | 10/2002 | Kishi | H03D 7/166 375/295 |
| 2003/0099283 A1* | 5/2003 | Dent | H04B 1/707 375/146 |
| 2004/0127187 A1* | 7/2004 | Peterson | H03D 3/007 455/323 |
| 2004/0192229 A1* | 9/2004 | Morris | H04B 1/0483 455/91 |
| 2004/0204100 A1* | 10/2004 | Braithwaite | H04B 1/0475 455/561 |
| 2004/0242178 A1* | 12/2004 | Kim | H03D 7/145 455/234.1 |
| 2004/0264583 A1* | 12/2004 | Ahmed | H03F 1/02 375/259 |
| 2005/0048931 A1* | 3/2005 | Wortel | H04L 27/12 455/91 |
| 2005/0078766 A1* | 4/2005 | Simon | H04B 1/0003 375/296 |
| 2005/0111573 A1* | 5/2005 | Shakeshaft | H03C 3/40 375/295 |
| 2005/0113043 A1* | 5/2005 | Eloranta | H04B 1/04 455/127.1 |
| 2005/0190854 A1* | 9/2005 | Shakeshaft | H03C 3/40 375/295 |
| 2005/0190856 A1* | 9/2005 | Kroebel | H04B 1/0475 375/296 |
| 2005/0191976 A1* | 9/2005 | Shakeshaft | H03C 3/40 455/118 |
| 2005/0255806 A1* | 11/2005 | Seo | H03C 3/40 455/20 |
| 2006/0091890 A1* | 5/2006 | Shimizu | G01V 3/06 324/354 |
| 2006/0126754 A1* | 6/2006 | Filimonov | H03C 3/40 375/296 |
| 2006/0188028 A1* | 8/2006 | Kim | H04B 1/709 375/257 |
| 2007/0142000 A1* | 6/2007 | Herzinger | H04B 1/04 455/91 |
| 2007/0160164 A1* | 7/2007 | Sahota | H03C 5/00 375/295 |
| 2009/0075620 A1* | 3/2009 | Aniruddhan | H03D 7/1441 455/326 |
| 2009/0075689 A1* | 3/2009 | Aniruddhan | H03D 7/165 455/550.1 |
| 2009/0190692 A1* | 7/2009 | Aniruddhan | H03C 3/40 375/295 |
| 2011/0143791 A1* | 6/2011 | Pan | H03F 1/32 455/500 |
| 2011/0150125 A1* | 6/2011 | Yu | H03M 1/68 375/295 |
| 2012/0177162 A1* | 7/2012 | Nedovic | H03D 13/008 375/373 |
| 2012/0286891 A1* | 11/2012 | Schimper | H04L 27/34 332/105 |
| 2012/0314737 A1* | 12/2012 | Vann | H04B 1/40 375/219 |
| 2013/0003881 A1* | 1/2013 | Ingels | H04L 27/122 375/259 |
| 2013/0093495 A1* | 4/2013 | Fukuda | G06G 7/14 327/361 |
| 2013/0259152 A1* | 10/2013 | Simon | H04L 27/00 375/295 |
| 2014/0036973 A1* | 2/2014 | Au | H03F 1/3247 375/221 |
| 2014/0055420 A1* | 2/2014 | Yokoi | G06F 3/03545 345/175 |
| 2014/0064201 A1* | 3/2014 | Zhu | H04W 4/005 370/329 |
| 2014/0191797 A1* | 7/2014 | Fleischer | H03F 1/025 330/127 |
| 2014/0226759 A1* | 8/2014 | Han | H04B 1/12 375/317 |
| 2015/0103948 A1* | 4/2015 | Drees | H04L 1/206 375/296 |

\* cited by examiner

METHOD AND APPARATUS FOR MODULATING DATA AND RECORDING MEDIUM THEREOF

CROSS-REFERENCE TO RELATED APPLICATION(S)

This application claims the benefit of Korean Patent Application No. 10-2014-0100663, filed on Aug. 5, 2014, in the Korean Intellectual Property Office, the disclosure of which is incorporated herein in its entirety by reference.

BACKGROUND

1. Field

The following description relates to a method and apparatus for modulating data and a recording medium thereof.

2. Description of Related Art

With the advancement in wireless communication technology, an audio signal and a video signal are transmitted to or received at a remote place. When an audio signal and a video signal are transmitted, a signal of a communication frequency ranging from several hundreds of Mhz to several tens of Ghz, e.g., a radio-frequency (RF) signal, is used. The audio signal and the video signal are combined with the RF signal by transmission equipment and separated from the RF signal by receiving equipment. The combining of the audio signal and the video signal with the RF signal is referred to as modulation, and the separation of the audio signal and the video signal from the RF signal is referred to as demodulation.

In general, in order to combine input data, such as an audio signal and a video signal, with an RF signal, an appropriate sine wave is assigned to the input data and then the resultant input data is transmitted to a receiving side.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and apparatuses for reducing power loss that may occur during a modulation process of combining data with a radio-frequency (RF) signal.

In accordance with an embodiment, there is provided a method of modulating data, the method includes determining sizes of a first complex-number component and a second complex-number component of input data; and determining a cell to assign a sine wave to the input data, based on a difference between the sizes of the first complex-number component and the second complex-number component.

The method may also include configuring the cell to include a first cell to generate a sine wave corresponding to the first complex-number component, a second cell to generate a sine wave corresponding to the second complex-number component, and a third cell to selectively generate the sine wave corresponding to the first complex-number component and the sine wave corresponding to the second complex-number component.

The determining of the cell may include assigning a portion of the input data to the third cell in response to the difference between the sizes of the first and second complex components being equal to or greater than a threshold value.

In response to the difference between the sizes of the first and second complex components being equal to or greater than a threshold value, may further include assigning to the third cell a portion of the input data corresponding to the first or second complex-number component, which is greater in size than the other complex-number component; and supplying an intensity of power corresponding to the portion of the input data to the third cell.

The input data may include a piece of bit data, and the determining of the cell may include determining the cell to assign the piece of bit data included in the input data in preset symbols.

In response to the difference between a number of pieces of significant bit data corresponding to the first complex-number component and a number of pieces of significant bit data corresponding to the second complex-number component among pieces of bit data included in the input data being equal to or greater than a threshold value, may further include assigning to the third cell a portion of bit data corresponding to the first or second complex-number component, the number of pieces of significant bit data of which is greater than the number of pieces of significant bit data of the other complex-number component.

The determining of the at least one cell may include determining as the third cell a cell to which a portion of bit data corresponding to the first or second complex-number component is assigned when most significant bit data is assigned to the first or second complex-number component, among pieces of bit data included in the input data.

The determining of the sizes of the first complex-number component and the second complex-number component may include determining intensities of power required to assign corresponding sine waves to the first complex-number component and the second complex-number component, wherein the sizes of the first complex-number component and the second complex-number component may be determined based on information regarding the determined intensities of power.

In accordance with another embodiment, there is provided an apparatus for modulating data, the apparatus may include a controller configured to determine sizes of a first complex-number component and a second complex-number component of input data, and determine a cell to assign a sine wave to the input data, based on a difference between the sizes of the first complex-number component and the second complex-number component.

The apparatus may also include a communication unit configured to obtain information regarding complex components of the input data.

The cell may include a first cell configured to generate a sine wave corresponding to the first complex-number component; a second cell configured to generate a sine wave corresponding to the second complex-number component; and a third cell configured to selectively generate the sine wave corresponding to the first complex-number component and the sine wave corresponding to the second complex-number component.

The controller may assign a portion of the input data to the third cell in response to the difference between the sizes of the first and second complex components being equal to or greater than a threshold value.

The controller may include a power source to assign to the third cell a portion of the input data corresponding to the first or second complex-number component, which is greater in size than the other complex-number component and supplying an intensity of power corresponding to the portion of the input data to the third cell in response to the difference between the sizes of the first and second complex components being equal to or greater than a threshold value.

The input data may include a piece of bit data, and the controller determines the cell to assign the piece of bit data included in the input data in preset symbols.

The controller may assign to the third cell a portion of bit data corresponding to the first or second complex-number component, a number of pieces of significant bit data of which is greater than the number of pieces of significant bit data of the other complex-number component in response to the difference between a number of pieces of significant bit data corresponding to the first complex-number component and the number of pieces of significant bit data corresponding to the second complex-number component among pieces of bit data included in the input data being equal to or greater than a threshold value.

The controller may determine as the third cell a cell to which a portion of bit data corresponding to the first or second complex-number component is assigned when most significant bit data is assigned to the first or second complex-number component, among pieces of bit data included in the input data.

The controller may determine intensities of power required assigning corresponding sine waves to the first complex-number component and the second complex-number component, wherein the sizes of the first complex-number component and the second complex-number component may be determined based on information regarding the determined intensities of power.

The size of the first complex-number component is a size of an analog signal converted from the first complex-number component of the input data, and a size of the second complex-number component may be a size of an analog signal converted from the second complex-number component of the input data.

The controller may determine the size of the first complex-number component based on a value of a most significant bit (MSB) data among pieces of bit data corresponding to the first complex-number component, and may determine the size of the second complex-number component based on a value of a most significant bit (MSB) data among pieces of bit data corresponding to the second complex-number component.

In accordance with another embodiment, there is provided a non-transitory computer readable recording medium having recorded thereon a program causing a computer to perform the method described above.

Other features and aspects may be apparent from the following detailed description, the drawings, and the claims.

BRIEF DESCRIPTION OF THE DRAWINGS

These and/or other aspects will become apparent and more readily appreciated from the following description of the exemplary embodiments, taken in conjunction with the accompanying drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Embodiments will be hereinafter described with reference to the accompanying drawings in detail such that those of ordinary skill in the art could easily accomplish them. However, the inventive concept may have different forms and should not be construed as being limited to the embodiments herein. In the drawings, parts that are not related to the present disclosure are omitted to clearly describe various embodiments. Like reference numerals refer to like elements throughout.

It will be understood that when an element or layer is referred to as being "connected to" another element or layer, the element or layer can be "directly connected to" another element or layer or can be "electrically connected to" another element or layer with intervening elements or layers therebetween. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be described in detail with reference to the accompanying drawings.

Figure 1:
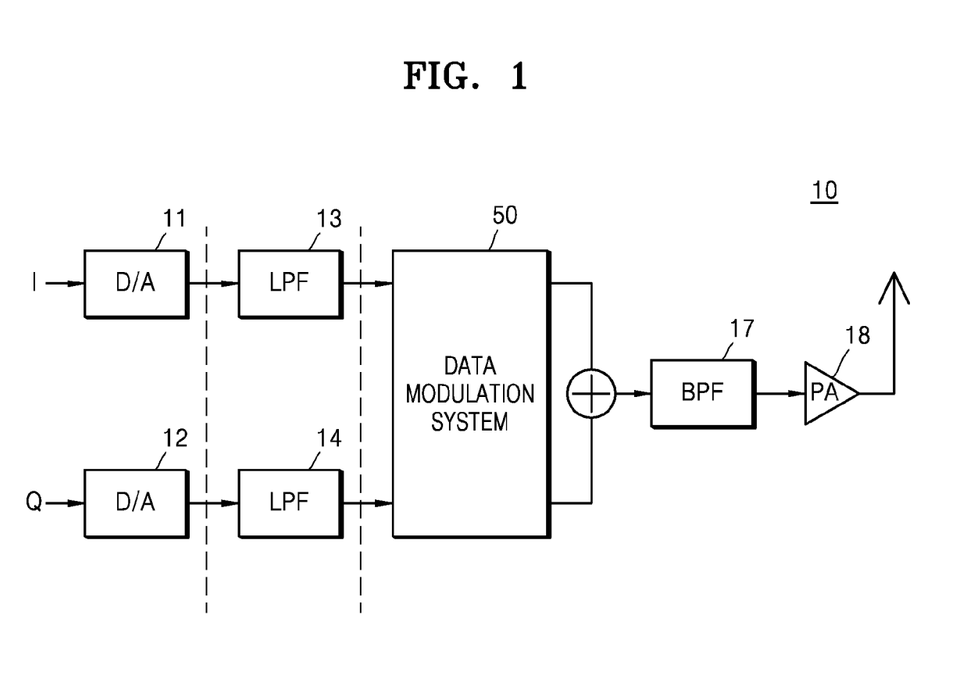
FIG. 1 is a diagram illustrating a data transmission system, according to an embodiment.

FIG. 1 is a diagram illustrating a data transmission system 10, according to an exemplary embodiment.

The data transmission system 10 includes digital-to-analog (D/A) converters 11 and 12, low-pass filters (LPFs) 13 and 14, a modulation system 50 (which may be also referred to as a 'modulation system'), a band-pass filter (BPF) 17, and a linear power amplifier (PA) 18.

The D/A converters 11 and 12 transform an in-phase component (hereinafter referred to as an "I-component") and a quadrature component (hereinafter referred to as a "Q-component"), which are discrete signals having a baseband frequency and containing pieces of bit data, into analog signals. The LPFs 13 and 14 filter signals that are generated at distant locations at multiples of a baseband sampling frequency.

According to an embodiment, the data modulation system 50 up-converts a frequency of an analog signal at a baseband by assigning a sine wave signal to the analog signal. An I-component of input data will be hereinafter referred to as a 'first complex-number component', and a Q-component of the input data will be referred to as a 'second complex-number component'. The above embodiment is just one example and the inventive concept is thus not limited thereto. In a complex-number domain, the data modulation system 50 is applicable to components that are phase-shifted by 90 degrees from each other.

A general data modulation system up-converts frequencies of a first complex-number component and a second complex-number component of input data by independently assigning sine waves thereto. According to an embodiment, the data modulation system 50 includes at least one dynamic local oscillator to select the first complex-number component or the second complex-number component and up-convert a frequency of the selected complex-number component.

The data modulation system 50 includes at least one cell to perform frequency up-conversion according to a component of input data. In one illustrative example, the at least one cell includes a local oscillator. The structure of the at least one cell will be described in detail with reference to FIGS. 6 and 7 below. According to an embodiment, the data modulation system 50 includes a first cell for up-converting a frequency of a first complex-number component, a second cell for up-converting a frequency of a second complex-number component, and a third cell for selectively up-converting the frequency of the first complex-number component and the frequency of the second complex-number component.

The data modulation system 50 supplies power to each of the at least one cell according to the components of the input data. For example, the data modulation system 50 determines sizes of a first complex-number component and a second complex-number component of the input data, based on obtained information about complex components. The data modulation system 50 controls power supplied from a power source inside or outside the data modulation system 50 to be assigned to cells corresponding to the complex components according to the size of the complex components.

When the difference between the intensities of power supplied to at least one cell included in the data modulation system 50 is large, power loss may occur due to interference between the at least one cell and other cells or within the at least one cell. According to an embodiment, the data modulation system 50 assigns to another cell a portion of data corresponding to a complex-number component of the input data that needs more power to be supplied thereto, based on the information regarding complex components of the input data. For example, the data modulation system 50 controls a portion of data corresponding to a first complex-number component to the third cell.

The BPF 17 filters a noise signal that is not completely removed by the LPFs 13 and 14. The linear PA 18 amplifies a signal output from the LPF 17 to generate an RF signal.

Figure 2:
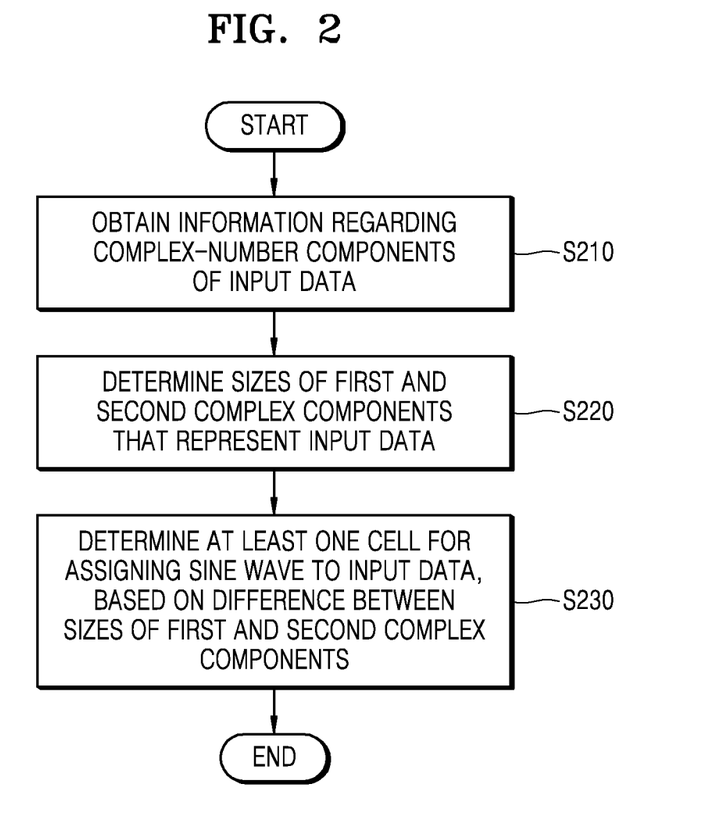
FIG. 2 is a flowchart of a method of modulating data, according to an embodiment.

FIG. 2 is a flowchart of a method of modulating data, according to an embodiment.

Figure 8:
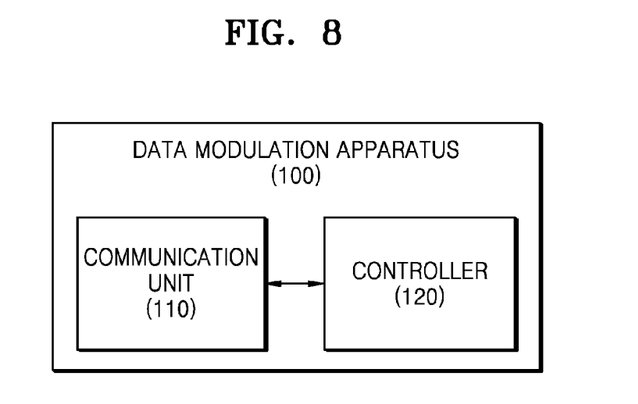
FIG. 8 is a block diagram of a data modulation apparatus, according to an embodiment.

In operation S210, the method of a data modulation apparatus 100 of FIG. 8 obtains information regarding a complex signal of input data. In one example, the input data is a discrete signal containing at least one piece of bit data. Information regarding complex components is information identifying a first complex-number component and a second complex-number component of the input data. The information regarding complex components includes information regarding a size or a phase of each of the complex components of the input data.

In operation S220, the method of the data modulation apparatus 100 determines the sizes of the first complex-number component and the second complex-number component that represent the input data, based on the obtained information regarding the complex signal. In one example, the size of the first complex-number component represents the size of an analog signal converted from the first complex-number component of the input data. The size of the second complex-number component represents the size of an analog signal converted from the second complex-number component of the input data.

However, the above embodiment is just an example and another embodiment may be provided. According to another embodiment, the sizes of the first complex-number component and the second complex-number component represent the intensities of power required to generate sine waves corresponding to the first complex-number component and the second complex-number component of the input data, respectively. For example, the method of the data modulation apparatus 100 of FIG. 8 determines a voltage to be applied to a local oscillator so as to assign a sine wave to the first complex-number component and a voltage to be applied to the local oscillator so as to assign a sine wave to the second complex-number component.

Also, the size of each of the complex components is determined according to a number of pieces of bit data contained in the input data. For example, when information regarding the first complex-number component and the second complex-number component is expressed in a codeword that is 14 bits long or less, the method of the data modulation apparatus 100 determines the sizes of the first and second complex components, based on the number of pieces of bit data corresponding to each of the first and second complex components.

Also, the method of the data modulation apparatus 100 determines the size of a complex-number component based on a value of a most significant bit (MSB) data among pieces of bit data corresponding to the complex-number component. For example, when a value of MSB data of the first or second complex-number component is '1' among the pieces of bit data corresponding to the first and second complex components, the method predicts that a value of power assigned to the first or second complex-number component is greater than a value of power assigned to the other complex-number component.

In operation S230, the method of the data modulation apparatus 100 determines at least one cell to assign a sine wave to the input data, based on the difference between the sizes of the first and second complex components. If the difference between the sizes of the first and second complex components is equal to or greater than a threshold value, the method assigns a portion of the input data to a cell capable of generating both a sine wave corresponding to the first complex-number component and a sine wave corresponding to the second complex-number component.

If the difference between the sizes of the first and second complex components is equal to or greater than a predetermined threshold value, the method of the data modulation apparatus 100 assigns a portion of the input data to third cells. For example, when the size of the first complex-number component is greater by the predetermined value or more than the size of the second complex-number component, a portion of the input corresponding to the first complex-number component is assigned to the third cells.

Figure 3:
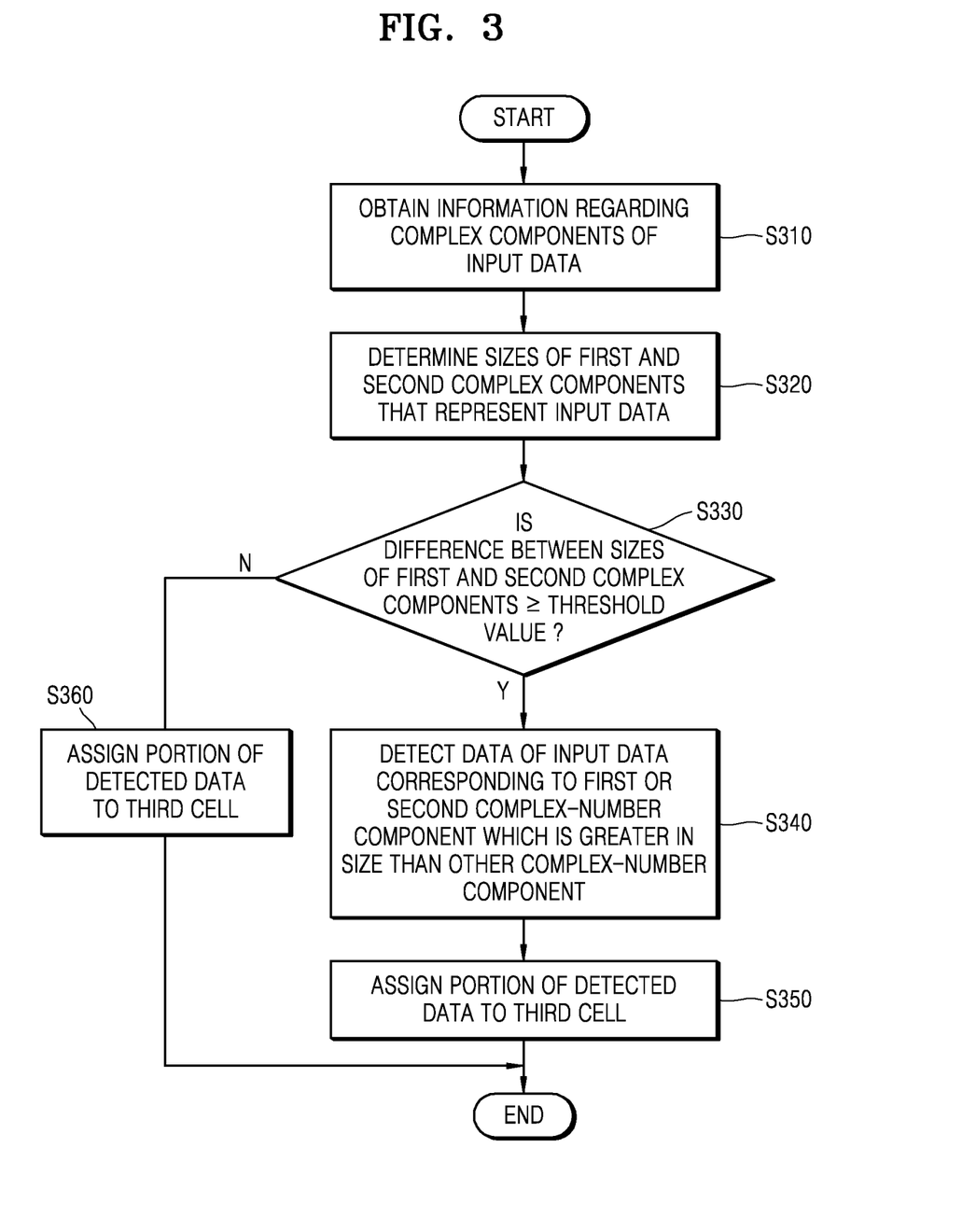
FIG. 3 is a flowchart of a method of determining a cell to assign a sine wave to input data based on sizes of different complex components, according to an embodiment.

FIG. 3 is a flowchart of a method of determining a cell to assign a sine wave to input data based on sizes of different complex components, the method being performed by a data modulation apparatus, according to an embodiment In operation S310, the method of the data modulation apparatus 100 obtains information regarding complex components of input data. In one example, the input data is a discrete signal containing at least one piece of bit data. The information regarding complex components contains attribute information of an analog signal converted from the input data. For example, the information regarding complex components may contain information regarding the size or phase of the analog signal converted from the input data.

In one example, operation 310 corresponds to operation 210 of FIG. 2.

In operation S320, based on the information regarding complex components, the method of the data modulation apparatus 100 determines the sizes of a first complex-number component and a second complex-number component that represent the input data.

In one example, operation 320 corresponds to operation 220 of FIG. 2.

In operation S330, the method of the data modulation apparatus 100 determines whether the difference between the sizes of the first and second complex components is equal to or greater than a threshold value. Based on the obtained information regarding complex components of the input data, the method determines whether the difference between the sizes of the first and second complex components is equal to or greater than the threshold value.

In operation S340, the method of the data modulation apparatus 100 detects data of the input data corresponding to the first or second complex-number component, which is greater in size than the other complex-number component. If the difference between the sizes of the first and second complex components is equal to or greater than the threshold value, the method detects data corresponding to the first or second complex-number component, which is greater in size than the other complex-number component. For example, the method of the data modulation apparatus 100 detects the data corresponding to the first complex-number component when the first complex-number component is greater than the threshold value or more than the second complex-number component.

In operation S350, the method of the data modulation apparatus 100 assigns a portion of the detected data to a third cell. When a sine wave is assigned to the input data, the method determines a complex-number component onto which power is predicted to be concentrated so as to prevent power from being concentrated onto a specific local oscillator, and assigns a portion of data corresponding to the determined complex-number component to the third cell.

According to an embodiment, the method of the data modulation apparatus 100 uniformly assigns power to cells generating at least one sine wave for modulating input data containing at least one piece of bit data. As a result, the method of the data modulation apparatus 100 effectively reduces problems caused due to power loss that may occur when power is concentrated onto a specific cell.

In operation S360, the method of the data modulation apparatus 100 assigns the input data to a first cell or a second cell. Otherwise, if the difference between the sizes of the first and second complex components is less than the threshold value, the method determines that power is not concentrated to a specific cell and assigns the first complex-number component to the first cell and the second complex-number component to the second cell.

Figure 4A:
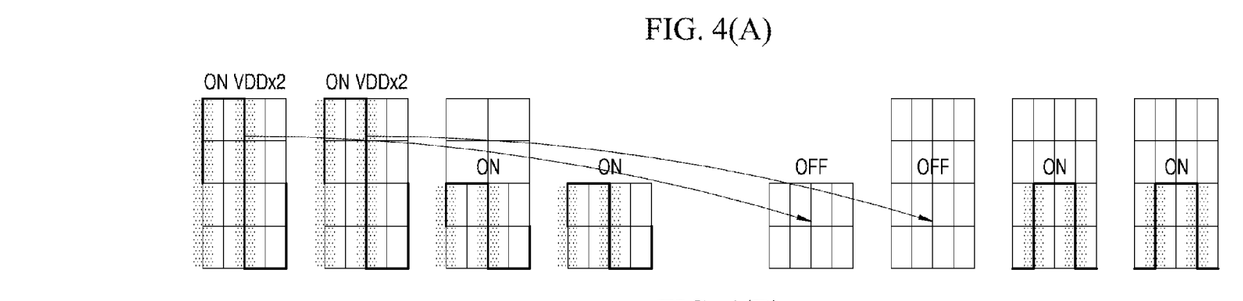
FIGS. 4(A) through 4(C) are diagrams illustrating a method of determining a cell to assign a sine wave to input data based on the sizes of different complex components, according to an embodiment.
Figure 4B:
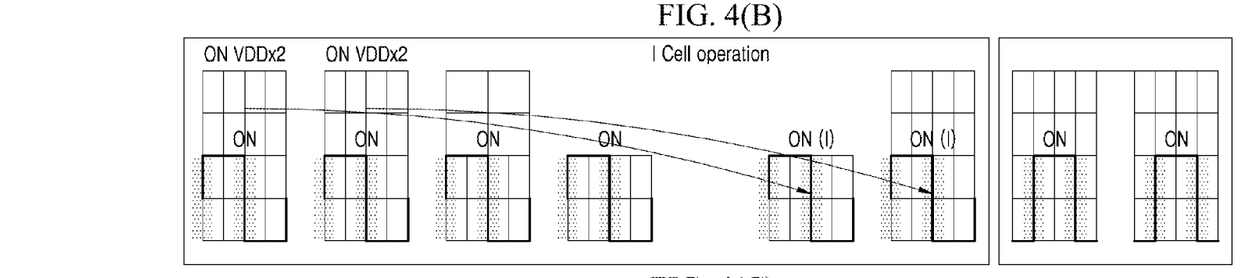
Figure 4C:
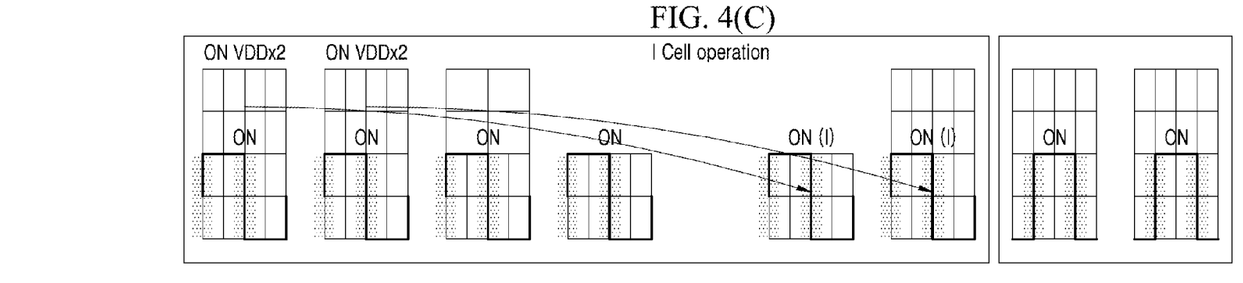

FIGS. 4(A) through 4(C) are diagrams illustrating a method of determining a cell to assign a sine wave to input data based on the sizes of different complex components, the method being performed by a data modulation apparatus 100 of FIG. 8, according to an embodiment.

Referring to FIG. 4(A), a voltage applied to first cells generating a sine wave to be assigned to a first complex-number component is higher by 4 V than a voltage applied to second cells generating a sine wave to be assigned to a second complex-number component. In this example, blocks of FIG. 4(A) each denote 0.5 V.

When voltages applied to cells generating sine waves to be assigned to complex components are different, power loss may occur. Referring to FIG. 4(B), according to an embodiment, the data modulation apparatus 100 assigns some first complex components to a third cell.

Referring to FIG. 4(C), as a result of assigning some of the first complex components to the third cell, voltages applied to a first cell, a second cell, and the third cell are controlled to be the same.

Figure 5:
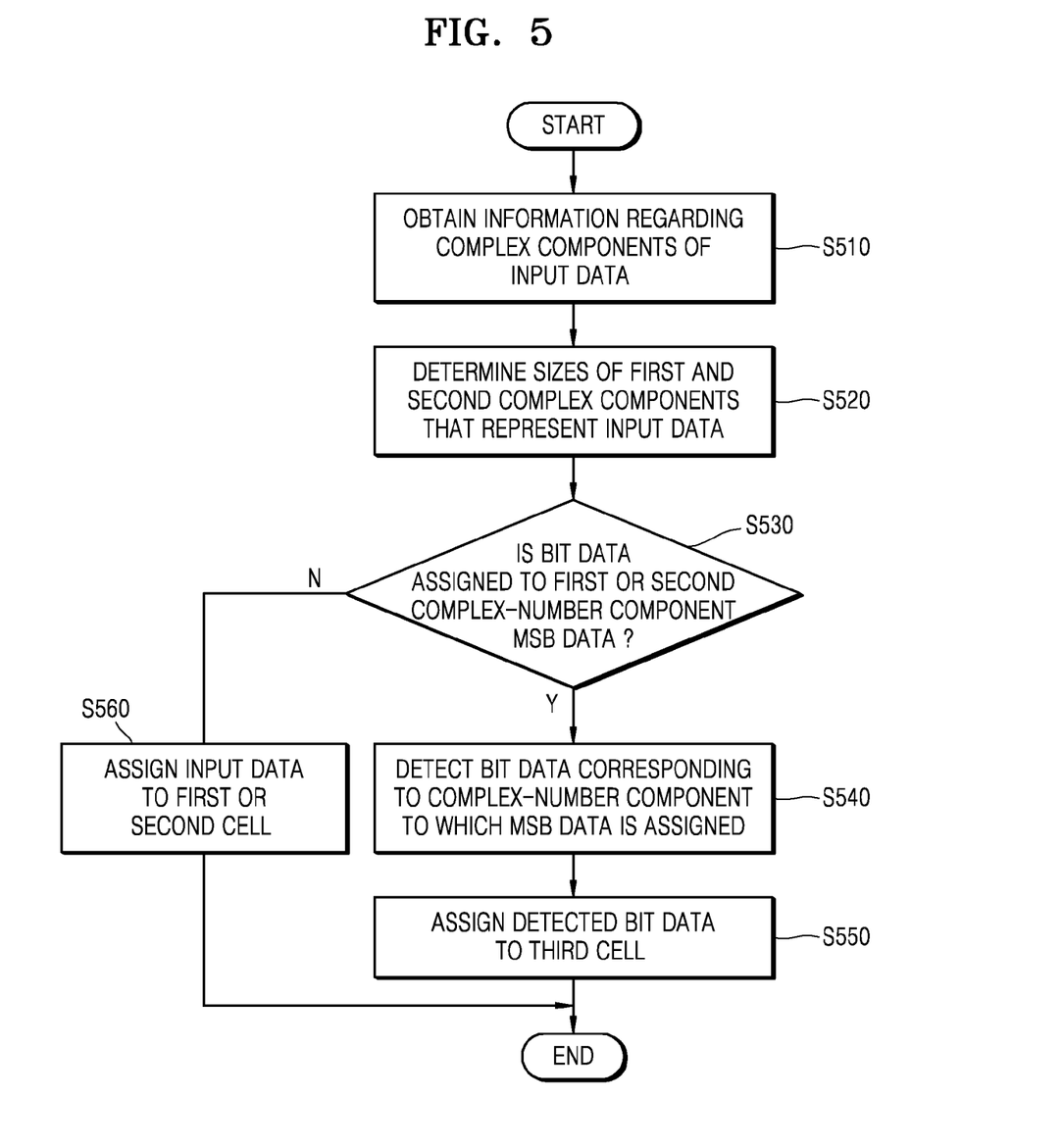
FIG. 5 is a flowchart of a method of determining a cell to assign a sine wave to input data based on sizes of different complex components of the input data, according to another embodiment.

FIG. 5 is a flowchart of a method of determining a cell to assign a sine wave to input data based on sizes of different complex components of the input data, the method being performed by a data modulation apparatus 100 of FIG. 8, according to another embodiment.

In operation S510, the method of the data modulation apparatus 100 obtains information regarding complex components of input data. In one example, the input data is a discrete signal containing at least one piece of bit data. Also, the information regarding complex components includes attribute information of an analog signal converted from the input data. For example, the information regarding complex components includes information regarding the size or phase of the analog signal converted from the input data.

In one example, operation 510 corresponds to operation 210 of FIG. 2.

In operation S520, the method of the data modulation apparatus 100 determines the sizes of a first complex-number component and a second complex-number component that represent the input data, based on the obtained information about the complex components.

In one example, operation 520 corresponds to operation 220 of FIG. 2.

In operation S530, the method of data modulation apparatus 100 checks whether bit data assigned to the first or second complex-number component is MSB data. For example, if bit data corresponding to the first complex-number component is '1101010' and bit data corresponding to the second complex-number component is '0101010', the method determines that MSB data is assigned to only the first complex-number component.

In operation S540, the method of the data modulation apparatus 100 detects bit data corresponding to the complex-number component to which the MSB data is assigned. For example, the data modulation apparatus 100 detects the MSB data among pieces of bit data corresponding to the first complex-number component. According to another embodiment, the method of the data modulation apparatus 100 compares pieces of bit data corresponding to the first complex-number component and pieces of bit data corresponding to the second complex-number component, and detects some bit data among the pieces of bit data corresponding to the first complex-number component so as to equalize the intensities of power required to assign sine waves to the first and second complex components.

In operation S550, the method of the data modulation apparatus 100 assigns the detected bit data to a third cell. When a sine wave is assigned to the input data, the method determines a complex-number component onto which power is predicted to be concentrated so as to prevent power from being concentrated onto a specific local oscillator. Further, the method assigns some of data corresponding to the determined complex-number component to the third cell.

In operation S560, otherwise, if MSB data is not assigned to the first or second complex-number component, the method of the data modulation apparatus 100 assigns the input data to a first or second cell.

Figure 6:
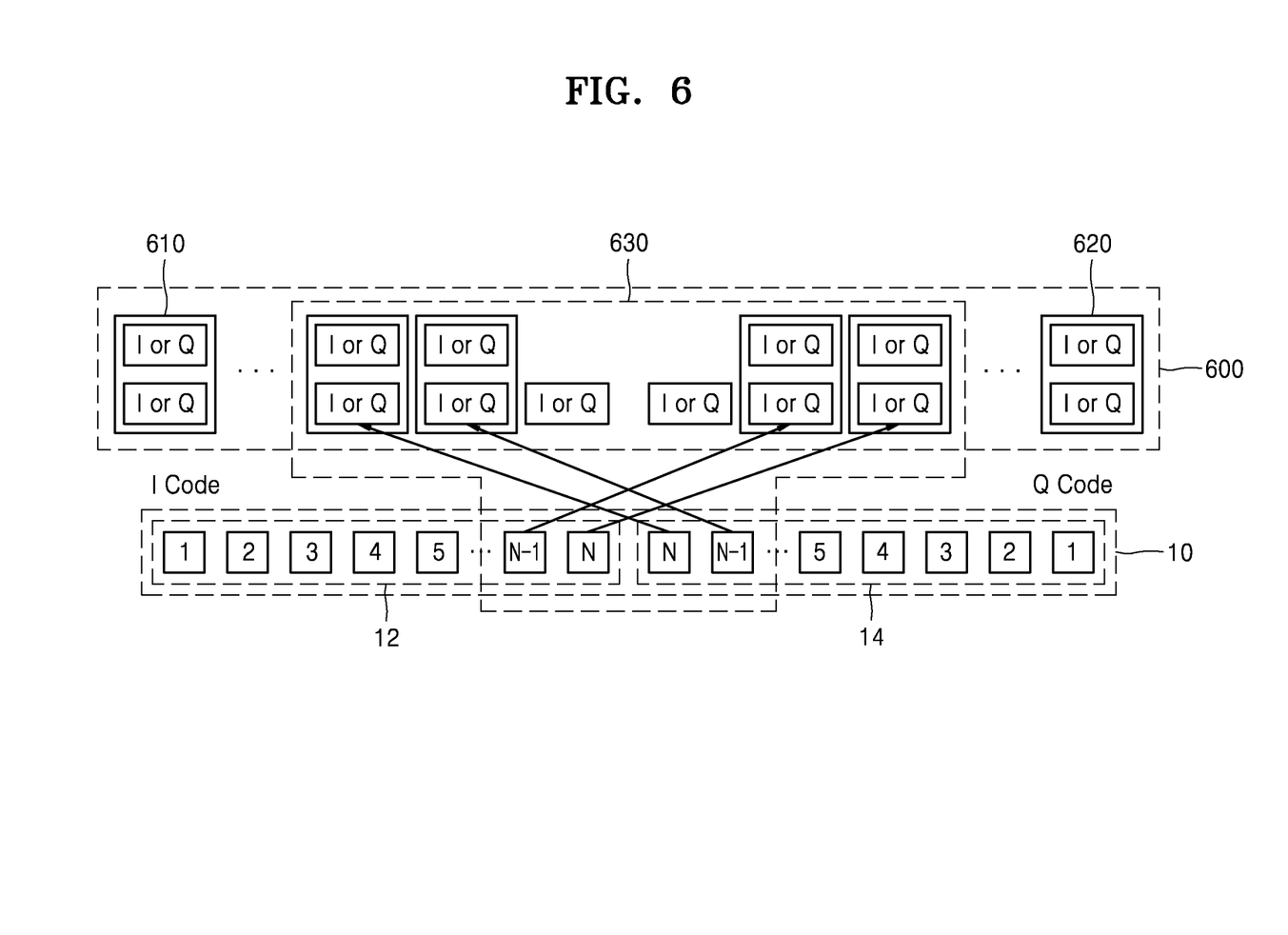
FIG. 6 is a flowchart of a method of assigning pieces of bit data included in input data to a third cell, according to an embodiment.

FIG. 6 is a flowchart of a method of assigning pieces of bit data included in input data 10 to a third cell, the method being performed by the data modulation apparatus 100 of FIG. 8, according to an embodiment.

Referring to FIG. 6, a cell set 600 includes a first cell set 610, a second cell set 620, and a third cell set 630. In one example, the first cell set 610 is a set of first cells generating a sine wave to be assigned to a first complex-number component 12. The second cell set 620 is a set of second cells generating a sine wave to be assigned to a second complex-number component 14. The third cell set 630 is a set of third cells selectively generating the sine wave to be assigned to the first complex-number component 12 and the sine wave to be assigned to the second complex-number component 14.

The cell set 600 receives the input data 10 from the data modulation apparatus 100 in the data modulation system 50. In one example, the input data 10 includes the first complex-number component 12 and the second complex-number component 14. Referring to FIG. 6, the first complex-number component 12 and the second complex-number component 14 each includes N pieces of bit data.

In general, the first complex-number component 12 is assigned to the first cell set 610 and the second complex-number component 14 is assigned to the second cell set 620. According to an embodiment, the data modulation apparatus 100 assigns some of the N pieces of bit data included in each of the first cell set 610 and the second complex-number component 14 to the third cell set 630. The third cell set 630 assigns a sine wave corresponding to the first complex-number component 12 to received bit data when the received bit data is included in the first complex-number component 12. Further, the third cell set 630 assigns a sine wave corresponding to the second complex-number component 14 to received bit data when the received bit data is included in the second complex-number component 14.

Referring to FIG. 6, MSB data N and bit data N−1 included in each of the first complex-number component 12 and the second complex-number component 14 are assigned to the third cell set 630.

According to an embodiment, the data modulation apparatus 100 assigns pieces of bit data included in each of the complex components such that the same number of pieces of bit data is assigned to the first cell set 610, the second cell set 620, and the third cell set 630, thereby reducing power loss caused by the difference between the intensities of power supplied to the first to third cells 610 to 630.

Figure 7:
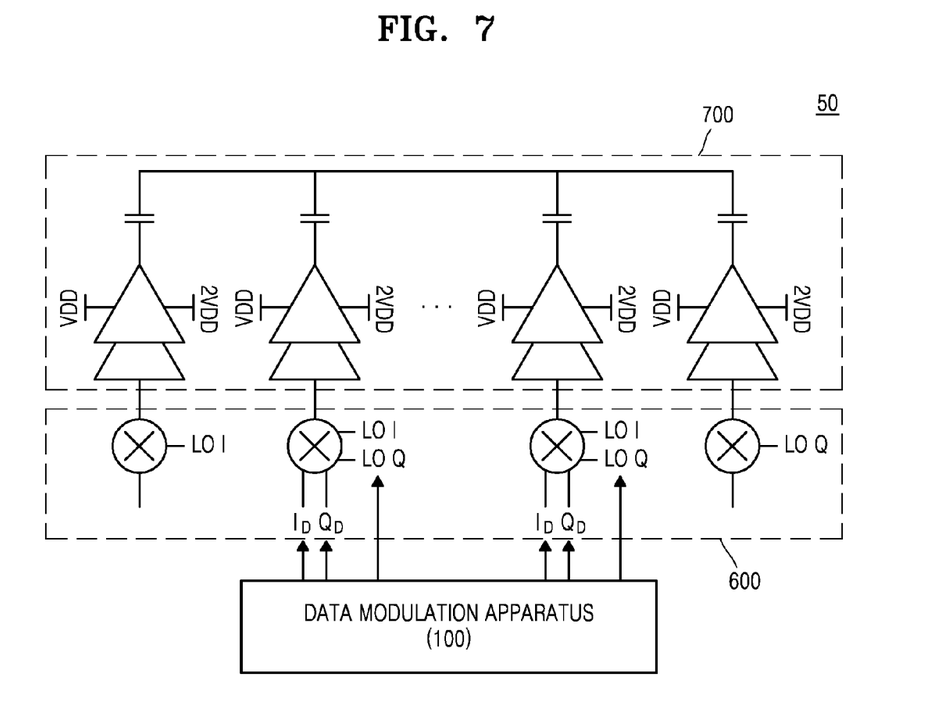
FIG. 7 is a diagram illustrating the structure of a data modulation system, according to an embodiment.

FIG. 7 is a diagram illustrating the structure of a data modulation system 50, according to an embodiment.

The data modulation system 50 includes a data modulation apparatus 100, a cell set 600, and a power source device 700.

According to an embodiment, the data modulation apparatus 100 obtains or receives information regarding complex components of input data. The data modulation apparatus 100 determines cells to which the complex components are to be assigned, respectively, based on the information regarding complex components.

In the cell set 600 included in the data modulation system 50, the first cell set 610, the second cell set 620, and the third cell set 630 of FIG. 6 are present. Although FIG. 7 illustrates the cell set 600 including one first cell, one second cell, and two third cells, the number of cells included in the cell set 600 is not limited to this example. A different number of cells may be configured in the cell set 600 to achieve similar or same result.

The data modulation apparatus 100 assigns pieces of bit data included in the input data to the first cell set 610, the second cell set 620, and the third cell set 630. A method of assigning complex components to the first to third cell sets 610 to 630 by the data modulation apparatus 100 is as described above with reference to FIG. 2.

When the data modulation apparatus 100 assigns complex components to cells included in the cell set 600, the power source device 700 applies preset voltages to the cells to which the complex components are assigned, respectively.

When the preset voltages are applied to the cells included in the cell set 600 from the power source device 700, local oscillators included in the cells vibrate. As the local oscillators vibrate, sine waves corresponding to the complex components are generated.

When sine waves generated by the cell set 600 are assigned to the complex components included in the input data, an RF signal is generated.

FIG. 8 is a block diagram of a data modulation apparatus 100, according to an embodiment.

The data modulation apparatus 100 includes a communication unit 110 and a controller 120. In an alternative configuration, the number of structural elements in the data modulation apparatus 100 may vary.

The communication unit 110 obtains information regarding a complex signal of input data. In one example, the input data is a discrete signal containing at least one piece of bit data. Also, the information regarding complex signal may include information identifying a first complex-number component and a second complex-number component of the input data. The information regarding complex components may include information regarding the size or phase of each of the complex components of the input data.

The controller 120 determines sizes of a first complex-number component and a second complex-number component that represent the input data, based on information regarding the complex signal. In one example, the size of the first complex-number component represents the size of an analog signal converted from the first complex-number component of the input data. The size of the second complex-number component represents the size of an analog signal converted from the second complex-number component of the input data.

According to another embodiment, the sizes of the first and second complex components represent the intensities of power required to generate sine waves corresponding to the first and second complex components of the input data. For example, the controller 120 determines a voltage to be applied to a local oscillator so as to assign a sine wave to the first complex-number component and a voltage to be applied to the local oscillator so as to assign a sine wave to the second complex-number component.

Also, the size of each of the complex components is determined according to the number of pieces of bit data thereof included in the input data. For example, when information regarding the first complex-number component and the second complex-number component is expressed in a codeword that is 14 bits long or more, the controller 120 determines the size of each of the first and second complex components based on the number of pieces of bit data corresponding thereto.

Also, the controller 120 determines the size of a complex-number component based on a value of MSB data among pieces of bit data corresponding to the complex-number component. For example, when a value of MSB data of the first or second complex-number component, among pieces of bit data corresponding to the first complex-number component and pieces of bit data corresponding to the second complex-number component, is '1', the controller 120 predicts that the intensity of power assigned to the first or second complex-number component is greater than the intensity of power assigned to the other complex-number component.

The controller 120 determines at least one cell to assign a sine wave to the input data, based on the difference between the sizes of the first and second complex components. If the difference between the sizes of the first and second complex components is equal to or greater than a threshold value, the controller 120 assigns a portion of the input data to a cell capable of generating both, a sine wave corresponding to the first complex-number component and a sine wave corresponding to the second complex-number component.

If the difference between the sizes of the first and second complex components is equal to or greater than a predetermined threshold value, the controller 120 assigns a portion of the input data to third cells. For example, when the size of the first complex-number component is greater than the threshold value or greater than the size of the second complex-number component, the controller 120 assigns a portion of the input data corresponding to the first complex-number component to the third cells.

It is to be understood that in the embodiment of the present invention, the operations in FIGS. 2-3 and 5-6 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 2-3 and 5-6.

Program instructions to perform a method described in FIGS. 2-3 and 5-6, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

The units and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processor.

The particular implementations shown and described herein are embodiments and are not intended to otherwise limit the scope of the inventive concept in any way. For the sake of brevity, conventional electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless it is specifically described as "essential" or "critical".

The use of the terms "a", "an", and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of modulating data, the method comprising:
   determining, by a processor, sizes of a first complex-number component and a second complex-number component of input data;
   determining, by the processor, a cell, from a cell set, the cell configured to assign a sine wave to the input data, the cell being determined based on a difference between the sizes of the first complex-number component and the second complex-number component;
   assigning, by the processor, the input data to the cell; and
   applying, by a power source device, a voltage to the cell to generate a radio-frequency (RF) signal corresponding to the sine wave by vibration of a local oscillator of the cell.

2. The method of claim 1, wherein the cell set comprises:
   a first cell configured to generate a sine wave corresponding to the first complex-number component,
   a second cell configured to generate a sine wave corresponding to the second complex-number component, and
   a third cell configured to selectively generate the sine wave corresponding to the first complex-number component and the sine wave corresponding to the second complex-number component.

3. The method of claim 2, wherein the assigning comprises assigning a portion of the input data to the third cell in response to the difference between sizes of the first and second complex components being equal to or greater than a threshold value.

4. The method of claim 2, further comprising: in response to the difference between the sizes of the first and second complex components being equal to or greater than a threshold value, assigning, by the processor, to the third cell a portion of the input data corresponding to the first or second complex-number component-that is greater in size than the other complex-number component; and
   controlling, by the processor, the power source device to supply an intensity of power, corresponding to the portion of the input data, to the third cell.

5. The method of claim 1, wherein the input data comprises a piece of bit data, and
   the determining of the cell from the cell set comprises determining the cell to be assigned the piece of bit data included in the input data based on preset symbols.

6. The method of claim 2, further comprising:
   in response to a difference between a number of pieces of significant bit data corresponding to the first complex-number component and a number of pieces of significant bit data corresponding to the second complex-number component among pieces of bit data included in the input data being equal to or greater than a threshold value, assigning, by the processor, to the third cell a portion of bit data corresponding to the first or second complex-number component, the number of pieces of significant bit data of which is greater than the number of pieces of significant bit data of the other complex-number component.

7. The method of claim 2, wherein the determining of the cell from the cell set comprises:
   determining as the third cell a cell to which a portion of bit data corresponding to the first or second complex-number component is assigned in response to most significant bit data being assigned to the first or second complex-number component, among pieces of bit data included in the input data.

8. The method of claim 1, wherein the determining of the sizes of the first complex-number component and the second complex-number component comprises:
   determining intensities of power required to assign corresponding sine waves to the first complex-number component and the second complex-number component,
   wherein the sizes of the first complex-number component and the second complex-number component are determined based on information regarding the determined intensities of power.

9. An apparatus for modulating data, the apparatus comprising:
   a processor configured to determine sizes of a first complex-number component and a second complex-number component of input data, determine a cell, from a cell set, the cell configured to assign a sine wave to the input data, the cell being determined based on a difference between the sizes of the first complex-number component and the second complex-number component, and assign the input data to the cell;
   a power supply device configured to apply a voltage to the cell to generate a radio-frequency (RF) signal corresponding to the sine wave by vibration of a local oscillator of the cell.

10. The apparatus of claim 9, wherein the cell set comprises:
    a first cell configured to generate a sine wave corresponding to the first complex-number component;
    a second cell configured to generate a sine wave corresponding to the second complex-number component; and
    a third cell configured to selectively generate the sine wave corresponding to the first complex-number component and the sine wave corresponding to the second complex-number component.

11. The apparatus of claim 10, wherein the processor is further configured to assign a portion of the input data to the third cell in response to the difference between the sizes of the first and second complex components being equal to or greater than a threshold value.

12. The apparatus of claim 10, wherein the processor is further configured to assign to the third cell a portion of the input data corresponding to the first or second complex-number component that is greater in size than the other complex-number component and supply an intensity of power corresponding to the portion of the input data to the third cell, in response to the difference between the sizes of the first and second complex components being equal to or greater than a threshold value.

13. The apparatus of claim 9, wherein the input data comprises a piece of bit data, and
the processor is further configured to determine the cell from the cell set to be assigned the piece of bit data included in the input data based on preset symbols.

14. The apparatus of claim 10, wherein the processor is further configured to assign to the third cell a portion of bit data corresponding to the first or second complex-number component, a number of pieces of significant bit data of which is greater than a number of pieces of significant bit data of the other complex-number component, in response to a difference between a number of pieces of significant bit data corresponding to the first complex-number component and a number of pieces of significant bit data corresponding to the second complex-number component among pieces of bit data included in the input data being equal to or greater than a threshold value.

15. The apparatus of claim 10, wherein the processor is further configured to determine as the third cell a cell to which a portion of bit data corresponding to the first or second complex-number component is assigned in response to most significant bit data being assigned to the first or second complex-number component, among pieces of bit data included in the input data.

16. The apparatus of claim 10, wherein the processor is further configured to determine intensities of power required to assign corresponding sine waves to the first complex-number component and the second complex-number component,
wherein the sizes of the first complex-number component and the second complex-number component are determined based on information regarding the determined intensities of power.

17. The apparatus of claim 9, wherein the size of the first complex-number component is a size of an analog signal converted from the first complex-number component of the input data, and a size of the second complex-number component is a size of an analog signal converted from the second complex-number component of the input data.

18. The apparatus of claim 9, wherein the processor is further configured to determine the size of the first complex-number component based on a value of a most significant bit (MSB) data among pieces of bit data corresponding to the first complex-number component, and determine the size of the second complex-number component based on a value of a most significant bit (MSB) data among pieces of bit data corresponding to the second complex-number component.

19. A non-transitory computer-readable storage medium storing instructions that, when executed by a processor, cause the processor to perform the method of claim 1.

20. The apparatus of claim 9, further comprising:
a communication interface configured to obtain information regarding complex components of the input data, and to provide the information to the processor.

* * * * *